United States Patent
Chaudhari et al.

(10) Patent No.: US 10,162,783 B2
(45) Date of Patent: Dec. 25, 2018

(54) METHOD AND SYSTEM FOR DEFINING SLOT ADDRESSES

(71) Applicant: Rockwell Automation Technologies, Inc., Mayfield Heights, OH (US)

(72) Inventors: Chandresh R. Chaudhari, Reminderville, OH (US); Gregory A. Majcher, Broadview Heights, OH (US); Robert J. Kretschmann, Bay Village, OH (US); Sivaram Balasubramania, Solon, OH (US); Kendal R. Harris, Mentor, OH (US); Edward C. Korsberg, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 73 days.

(21) Appl. No.: 15/079,873

(22) Filed: Mar. 24, 2016

(65) Prior Publication Data

US 2016/0283427 A1 Sep. 29, 2016

Related U.S. Application Data

(60) Provisional application No. 62/139,337, filed on Mar. 27, 2015.

(51) Int. Cl.
*G06F 13/00* (2006.01)
*G06F 13/40* (2006.01)
(Continued)

(52) U.S. Cl.
CPC ....... *G06F 13/404* (2013.01); *G05B 19/0423* (2013.01); *G06F 13/4068* (2013.01);
(Continued)

(58) Field of Classification Search
CPC .......... G06F 13/385; G06F 2213/0042; G06F 13/4045; G06F 2213/00; G06F 2213/0024; G06F 2213/0016; H04L 12/40123
(Continued)

(56) References Cited

U.S. PATENT DOCUMENTS 6,738,920 B1 * 5/2004 Horne ................ G05B 19/0423
710/9
2006/0059325 A1 * 3/2006 Milne ................ G06F 13/4081
711/200

(Continued)

FOREIGN PATENT DOCUMENTS

DE  19750470 A1  6/1999

OTHER PUBLICATIONS

IBM Technical Disclosure Bulletin, International Business Machines Corp. (Thornwood); "Addressing Smart Devices by Incrementing and Decrementing the Address Identifier"; US, vol. 30, No. 7; Dated Dec. 1, 1987, p. 179/180.

(Continued)

*Primary Examiner* — Tim T Vo
*Assistant Examiner* — Kim T Huynh
(74) *Attorney, Agent, or Firm* — Boyle Fredrickson, SC (57) ABSTRACT

A method and system for assigning slot addresses to modules in an industrial control system is disclosed. The modules are set up in a daisy chain topology. On power-up, a first module in the chain reads its slot address from a user configurable input or sets its slot address to a default value. The first module communicates to its immediate right neighbor using a special, one-hop message. The neighboring modules communicate to receive each other's information. The first module then sets an enable signal between the modules and sends a slot number to the neighbor in a (Continued)

firmware message. The neighbor checks if the enable signal is set and verifies that the slot number is a valid slot number. If so, then the neighboring module accepts the slot and repeats the same procedure to its next immediate neighbor, and so on until the last module.

18 Claims, 7 Drawing Sheets

(51) Int. Cl.
  *G06F 13/42* (2006.01)
  *G05B 19/042* (2006.01)
  *H04L 29/12* (2006.01)
(52) U.S. Cl.
  CPC ...... *G06F 13/4247* (2013.01); *H04L 61/2038* (2013.01); *G05B 2219/21069* (2013.01); *G05B 2219/21081* (2013.01); *G05B 2219/21091* (2013.01)

(58) Field of Classification Search
  USPC .......... 710/300–306, 308, 100, 313; 713/500
  See application file for complete search history.

(56) References Cited

U.S. PATENT DOCUMENTS

| | | |
|---|---|---|
| 2009/0228609 A1 | 9/2009 | McFarland |
| 2014/0089548 A1* | 3/2014 | Prusia .................... G06F 12/02 |
| | | 710/305 |

OTHER PUBLICATIONS

Extended European Search Report dated Feb. 9, 2016; Application No. 16162710.4—(10) pages.

\* cited by examiner

METHOD AND SYSTEM FOR DEFINING SLOT ADDRESSES

CROSS-REFERENCE TO RELATED APPLICATIONS

This application claims priority to U.S. provisional application Ser. No. 62/139,337, filed Mar. 27, 2015, the entire contents of which is incorporated herein by reference.

BACKGROUND OF THE INVENTION

The present invention relates to industrial control systems and, in particular, a method and system of defining slot addresses for modules in an industrial control system.

Industrial controllers, such as programmable logic controllers (PLC's), are specialized electronic computer systems used for the control of industrial processes or machinery, for example, in a factory environment. Industrial controllers differ from conventional computers in a number of ways. Physically, they are constructed to be substantially more robust against shock and damage and to better resist external contaminants and extreme environmental conditions. The processors and operating systems are optimized for real-time control and execute languages allowing ready customization of programs to comport with a variety of different controller applications. Industrial controllers may have a user interface for accessing, controlling and/or monitoring the industrial controller, such as through a locally connected terminal having a keyboard, mouse and display.

As industrial processes grow in complexity, an increasing number of devices are being connected to the industrial controller. The devices are often distributed about a machine or along a process line. The increasing number of devices and distribution of these devices about the machine require more complex control programs. Further, the distributed devices require communications between the devices.

Industrial controllers may utilize one or more different numbers and types of network cards or adapters to communicate to other controllers, network devices in the controlled system, or to devices for the process or machinery to be controlled through special "control networks" suitable for highly reliable and available real-time communication. Such control networks commonly used in industrial control systems include, for example, ControlNet, DeviceNet, EtherNet/IP and Sercos, whose specifications are published and whose protocols are used broadly by a number of manufacturers and suppliers. Control networks differ from standard communication networks, such as Ethernet, by guaranteeing maximum communication delays. This may be obtained, for example, by pre-scheduling the bandwidth of the network and/or providing redundant communication capabilities to high-availability. Control networks also differ from one another in physical aspects, for example, the type of media (e.g., co-axial cable, twisted pair, light fiber, etc.), the protocols of its operation, (e.g., Baud rate, number of channels, word transmission size, use of connected messaging, etc.) and how the data is formatted and how it is collected into standard messages.

In order to communicate among the different modules, each module requires an address to which data messages can be transmitted. Further, the address of each module needs to be different than the addresses of the other modules in the system to ensure delivery of a data message to the correct module. Manual configuration of addresses can be time consuming, in particular, in view of the ever increasing number of modules. Distributed modules may require moving between locations to access each module and to complete a manual configuration. Manual configuration is also prone to human error and may result in one or more modules being assigned an incorrect or a duplicate address.

In order to reduce the length of the commissioning process and to reduce the potential for human error, methods for automatically assigning addresses to modules have been developed. However, these automatic assignment routines are typically executed from a central controller, such as a PLC or a Human Machine Interface (HMI). The central controller must communicate with every module in the system to assign the module an address. A table or database must typically be created and stored in the controller by the system designer defining the structure of the control system. Future modifications to the network require updating of the table or database. Further, a single point of failure in the industrial network may prevent the automatic assignment routine from completing, thereby delaying operation of the controlled system until the failure is resolved.

Thus, it would be desirable to provide an improved method and system for assigning slot addresses to modules in an industrial control system.

BRIEF DESCRIPTION OF THE INVENTION

The subject matter disclosed herein describes a method and system for assigning slot addresses to modules in an industrial control system. The modules may be connected to a backplane, such as Rockwell Automation's proprietary backplane, and communicate using an industrial protocol. The modules are set up in a comb topology with multiple modules connected in a daisy chain topology identified as a bank of modules. A first module, called the bank master, is positioned at one end of the bank of modules. On power-up, the bank master reads its slot address from a user configurable input, such as switches or a dial. If no user configurable input is present, the bank master assigns itself slot 0 as some bank master modules do not have a user configurable input located on them. After reading the user configurable input, the bank master communicates to its immediate right neighbor using a special message that only travels one hop (i.e., only to the next device in the daisy chain). This ensures that the each module only talks to its immediate neighbor during the slot assignment process. The two modules communicate to receive each other's information (e.g., a MAC address). After learning of the neighbor's presence, the bank master raises a logical connection between the two modules, or an enable line, to a high, or active, state. The bank master then sends a slot number to the neighbor in a firmware message. The bank master calculates this slot number by adding 1 to its own slot number. Optionally, slot numbers may be defined by adding any predefined number to its own slot number. When the neighbor receives this message, it first checks if the message came from the module it knows as its immediate left neighbor. The check may be performed, for example, by comparing the MAC address stored to the MAC address of the sender of the message. If the verification is successful, the bank master then checks if the enable line is active and also verifies that the slot number sent to it is a valid slot number, checking, for example, against an acceptable range. If all verification steps are successful, the neighbor accepts the slot address. This module now repeats the same procedure to its right immediate neighbor, and so on until the last module. When the last module in the bank learns that it has no right neighbor, it declares itself as "last module" in the bank and sends a message back to the bank master hat contains the size of the bank.

The protocol also includes a "Ready" mechanism where each module, upon getting its slot address assignment, starts sending a periodic message to the bank master to request permission to accept Common Industrial Protocol (CIP) communications. The bank master grants permission to requestors only once it receives the bank size message from the last module confirming successful completion of assigning slot addresses in the bank. This protocol decentralizes the slot addressing scheme and makes each module responsible for assigning and accepting a slot address to/from immediate neighbors and reduces burden on one device managing the entire slot addressing scheme. It also provides a safety mechanism where CIP communications can only start once the addressing is successful in an entire bank.

According to one embodiment of the invention, a method for assigning addresses to a plurality of modules in an industrial control system is disclosed. A first address is assigned to a first module, selected from the plurality of modules. Each of the plurality of modules is connected in a sequence for communication between each of the modules, and the first module is located at a first end of the sequence and assigns the first address to itself. A second address is generated with the first module, where the second address is different than the first address. The second address is transmitted to a second module located in the bank, where the second module is selected from the plurality of modules. The second address received by the second module is verified by the second module and assigned to the second module with the second module when the second module has verified the second address. The steps of generating a second address, transmitting the second address, verifying the second address, and assigning the second address are repeated with each of the remaining modules in the bank, where the second address is replaced by a unique address for each of the remaining modules until each of the plurality of modules in the bank receives one of the unique addresses.

According to another embodiment of the invention, a method for assigning addresses to a plurality of modules in an industrial control system is disclosed. A first address is assigned to a first module, where the first module is selected from the plurality of modules. The first module is located in a bank and assigns the first address to itself, and the rest of the modules are connected in a sequential manner along the bank. An end module located furthest along the bank from the first module is connected back to the first module. A binary pattern is generated in the first module for transmission to each of the plurality of modules and transmitted one bit at a time. A duration for which it takes the module to receive all bits of the binary pattern is measured in each of the plurality of modules. The first address is transmitted from the first module to each of the other modules, and a unique address is assigned to each of the other modules. Each of the other modules determines its unique address as a function of the duration measured and the first address, and each of the modules assigns its unique address to itself.

According to still another embodiment of the invention, a system for assigning addresses to a plurality of modules in an industrial control system is disclosed. The system includes a first module, selected from the plurality of modules, where the first module includes at least one electrical connector and a slot assigner. The slot assigner is executable on the first module to manage automatic assignment of a plurality of slot addresses. A first slot address, selected from the plurality of slot addresses, is assigned to the first module. The system also includes a plurality of additional modules, where each additional module is selected from the plurality of modules. The first module and each additional module define one bank of modules. Each of the additional modules includes a first electrical connector operatively connected to either the first module or another of the additional modules and a second electrical connector operatively connected to either another of the additional modules or an endcap. The first module communicates with each of the plurality of additional modules to verify that the first module, and each of the plurality of additional modules is assigned one of the plurality of slot addresses.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Figure 1:
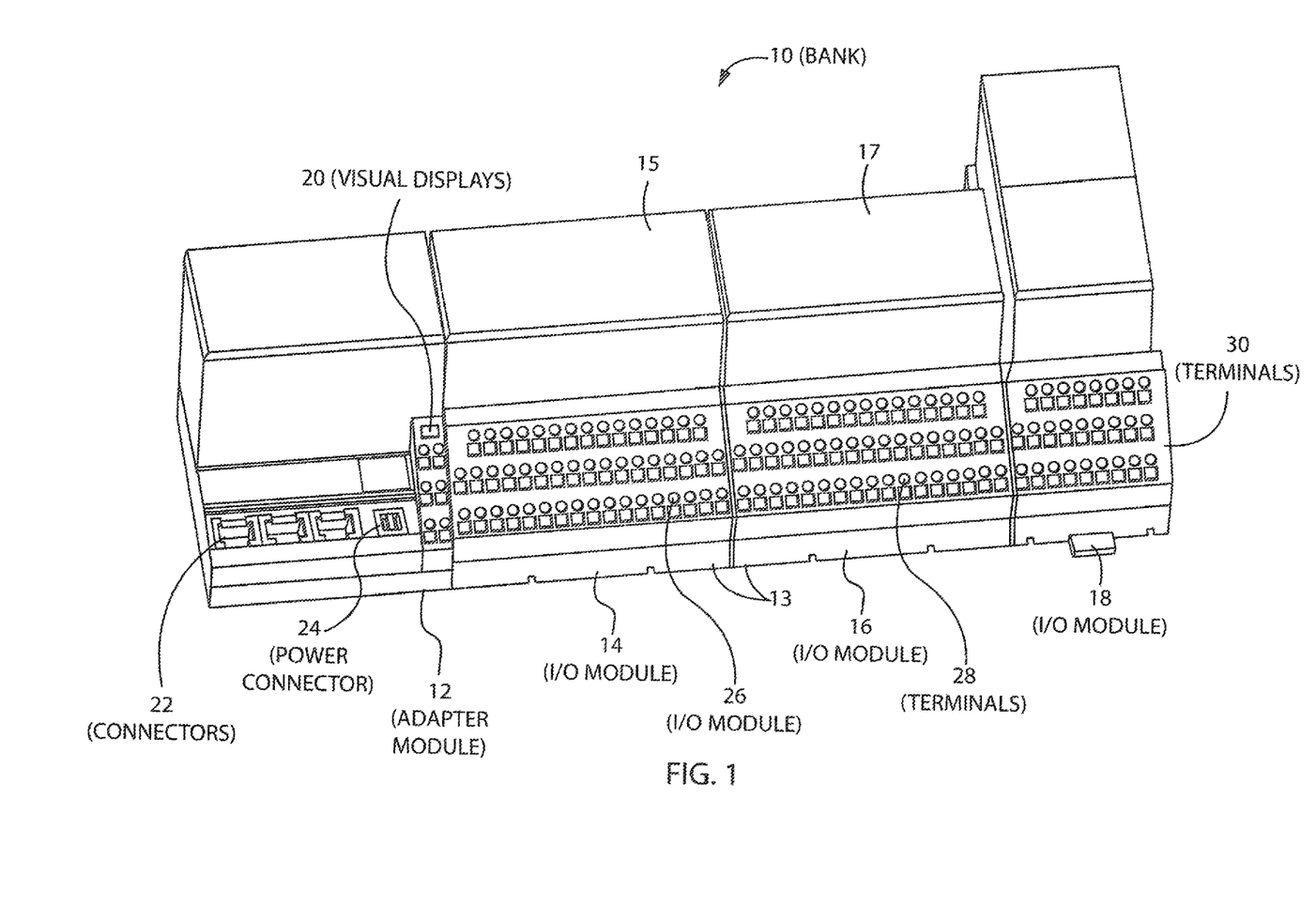
FIG. 1 is an isometric view of a bank of base modules for an industrial control system in accordance with an embodiment of the present invention.

Turning initially to FIG. 1, a bank of modules 10 for an industrial control system in accordance with one embodiment of the present invention is illustrated. The bank of modules 10 includes a series of enclosures arranged from left to right, side-by-side, with complex shapes that may be generally described as cubic. The series of enclosures include a left most adapter module 12, followed by a first I/O module 14, a second I/O module 16, and a third I/O module 18. Each module is held in close proximity to the other, thereby facilitating electrical connections side by side. Each module may be held by attachment to a DIN rail 50, see also FIG. 2. In an alternative embodiment, one or more modules may be held with greater separation and having electrical connections supported by network cabling.

The adapter module 12 may further comprise a plurality of various connectors 22, as well as visual displays 20 and/or LED's for system monitoring, located on one or more respective surfaces. Possible connectors may include, for example, a plurality of RJ-45 network connectors for network connectivity of the bank, for example, to a remote computer or to a Programmable Logic Controller (PLC); a Universal Serial Bus (USB) and/or IEEE 1394 connector for a locally connected terminal or device; or any other advantageous connector as known in the art. The adapter module 12 also includes a power connector 24 for powering the bank.

It is contemplated that each module may include a base and a chassis mounted to the base. Referring again to FIG. 1, different I/O modules 14, 16 may utilize a common base 13 where the base includes common components between modules, such as interconnections between adjacent modules and between the terminals 26, 28 and a connector to the chassis 15, 17. Each chassis 15, 17 includes components that differ between modules, such as logic circuits to receive inputs or drive outputs, or to process analog or digital signals. Each chassis 15, 17 may be plugged into the base 13 and provided as a complete I/O module 14, 16. The other modules, such as the adapter module 12 and the third I/O module 18 may similarly include a base and chassis configuration where the base for each is different than the base 13 for the first and second I/O module 14, 16. According to another embodiment of the invention, each module may have a single housing or, optionally, a combination of modules including a single housing or a base and chassis construction may be utilized. The base for each module may include electrical connectivity and base logic to facilitate a common system backplane between the modules.

I/O modules 14, 16 and 18 may further comprise a plurality of electrical terminals (or terminal blocks) 26, 28 and 30, respectively, for receiving conductors exposed on the surface of each enclosure to releasably retain electrical conductors communicating between the I/O module and a device on the controlled processes or machines (not shown). Each chassis of the I/O module may resemble the other in size, color and shape, though these aspects may differ by function. The number of terminals present in each terminal block 26, 28 and 30 may differ according to the base and to the function of the I/O module. The I/O modules 14, 16, and 18 may be configured, for example, to receive either an analog or digital input or output. The input or output voltages may be, for example, a DC voltage between 5-48 VDC or an AC voltage of 120 VAC.

Figure 2:
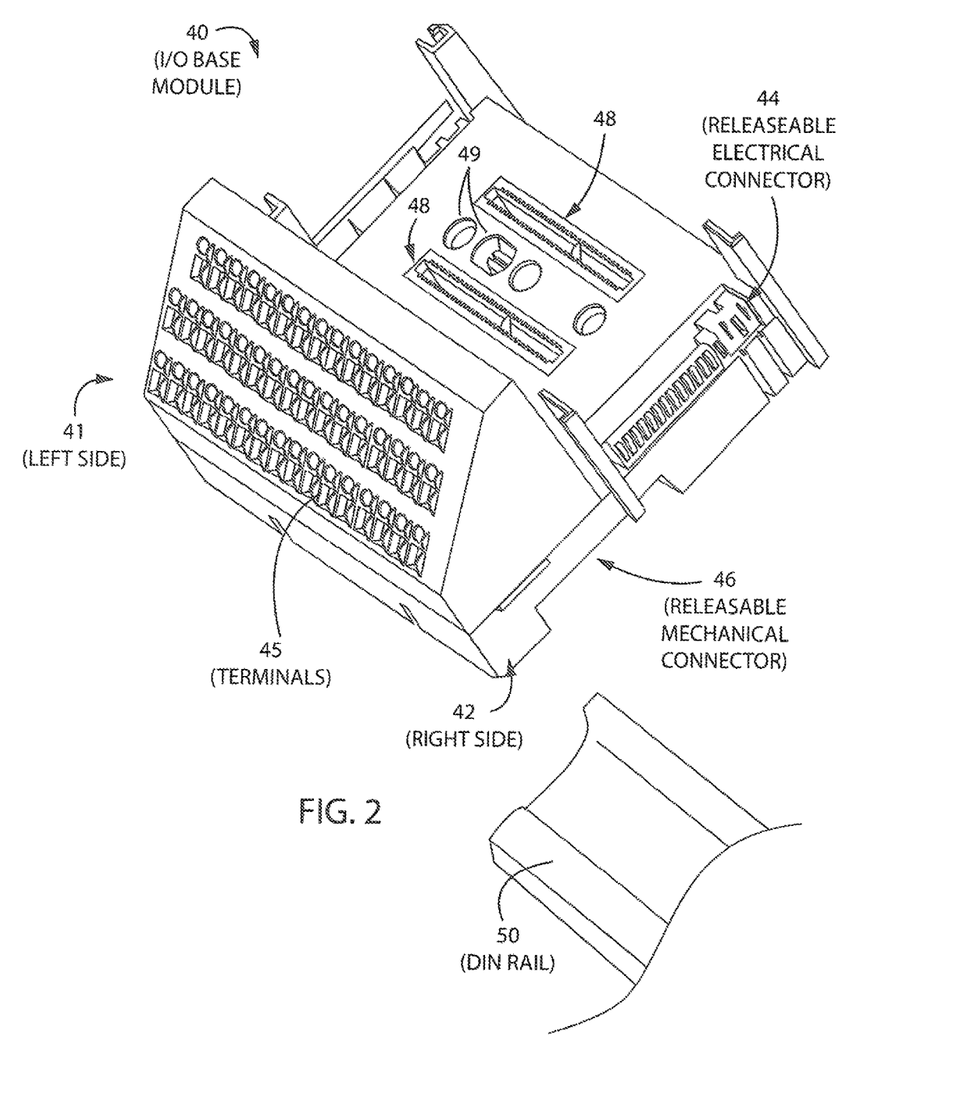
FIG. 2 is an isometric view of a single I/O base module in accordance with an embodiment of the present invention.

Referring now to FIG. 2, an exemplary base 40 for an I/O module in accordance with an embodiment of the present invention is illustrated. The I/O module base 40 has a housing with a left side 41 and a right side 42. Each side may further comprise a releasable electrical connector 44 supported on each side and exposed to connect to adjacent modules on the left and right sides. The I/O module base 40 may further comprise a releasable mechanical connector 46 for holding the I/O module in position relative to the adjacent modules by attachment, for example, to a DIN rail 50. As described above, each I/O module base 40 may further comprise a plurality of electrical terminals (or terminal blocks) 45 for receiving conductors exposed on the surface of the enclosure to releasably retain electrical conductors communicating between devices on the controlled processes or machines and I/O function card held within the chassis of the I/O module. One or more slots 48 may be provided on the base 40 to establish electrical connections between the base 40 and a chassis mounted on the base. Similarly, one or more mating receptacles 49 may be provided to establish a mechanical connection with and positively retain the chassis to the base.

Figure 3:
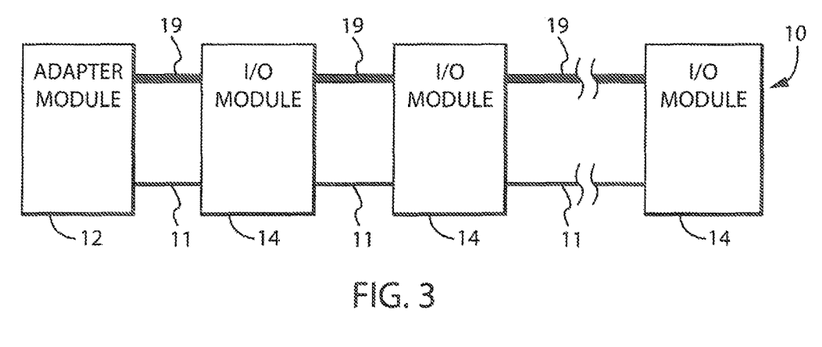
FIG. 3 is a block diagram representation of a single bank of modules according to one embodiment of the invention.

Turning next to FIG. 3, a single bank 10 of modules is represented in accordance with an embodiment of the present invention. The adapter module 12 is located at the left-most position in the bank 10 and multiple I/O modules 14 are sequentially connected moving to the right along the bank 10. The configuration is, however, not intended to be limiting. It is contemplated that the adapter module 12 may be located on the right-most position or at a position within the bank 10. A backplane 19 is established for communication between each of the modules. The backplane 19 may be a bus, discrete connections, or a combination thereof. The backplane 19 may be routed on circuit boards, cabling, or other conductors within the base to the electrical connectors on the side of the module base. Adjacent electrical connectors may be mated together to establish direct electrical connections between modules. Optionally, cables may be run between electrical connectors positioned remotely from each other or a combination of direct and remote connections may be utilized to form the backplane 19. According to the illustrated embodiment, the backplane 19 forms a daisy-chain connection between each of the modules located in the bank 10. An additional logical connection 11 is established between each of the modules. The logical connection 11 may also be routed on circuit boards, cabling, or other conductors within the base to the electrical connectors on the side of the module base. Adjacent electrical connectors may be mated together to establish direct electrical connections between modules. Optionally, a conductor may be connected between modules to establish the logical connection 11 between modules. According to still another embodiment of the invention, the logical connection 11 may be transmitted along the backplane 19 between modules.

Figure 4:
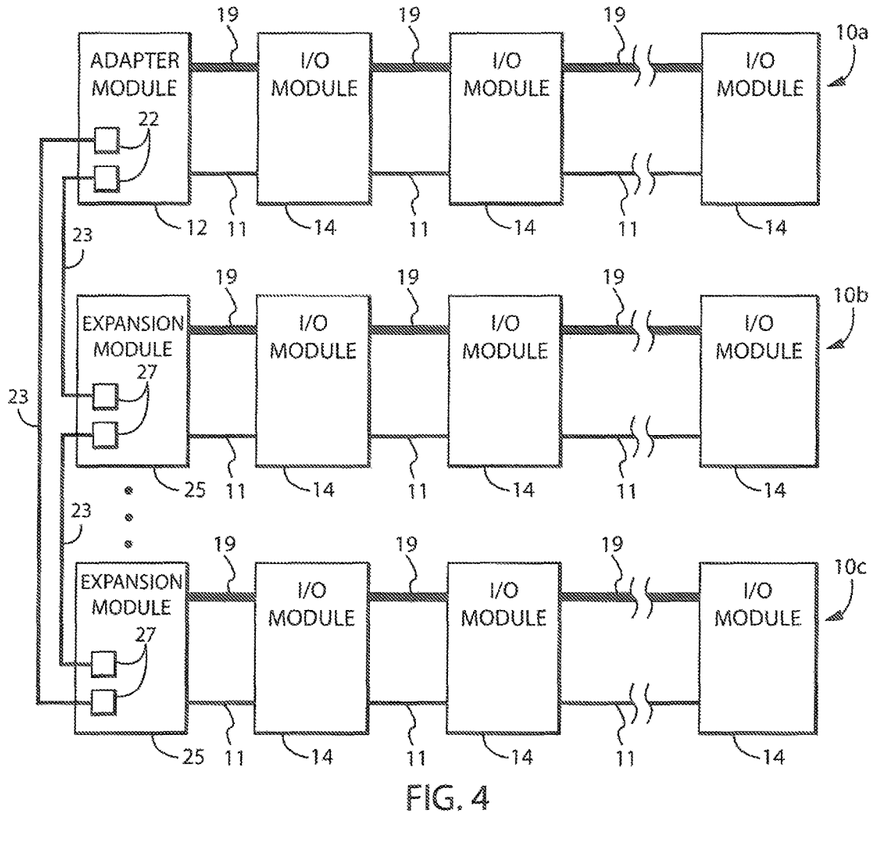
FIG. 4 is a block diagram representation of multiple banks of the modules in FIG. 3.

In a system comprising a plurality of banks, each bank may be connected according to various network topologies, such as a ring, star, or a combination thereof. According to an exemplary embodiment of the invention as illustrated in FIG. 4, the modules may be connected in a comb topology. The first bank 10a includes the adapter module 12 in the left-most position, and each of the additional banks 10b, 10c include an expansion module 25 located at the left-most position. The expansion modules 25 may include a subset of the functions of the adapter module 12 and may only include, for example, connectors for connection to the adapter module 12 and not to other external networks. It is contemplated, however, that additional banks 10 may include a second or still further additional adapter module 12. Optionally, a combination of adapter modules 12 and expansion modules 25 may be included as the left-most module in each bank 10 of the industrial network. Each bank 10 includes a separate backplane between the modules connected on the bank 10 and the adapter and expansion modules 25 provide communication between banks 10. Network media 23 is connected between ports 22 on each adapter module and ports 27 on each expansion module to establish communications between banks 10.

In operation, one embodiment of defining slot addresses will be discussed with respect to a single bank 10 of modules as illustrated in FIG. 3. One of the modules in each bank is defined as the bank master. Preferably, a module on one end of the bank is selected to be the bank master. In the illustrated embodiment, the left-most module or the adapter module 12 is selected to be the bank master, where the bank master is configured to execute a slot addressing routine upon power-up.

Figure 8:
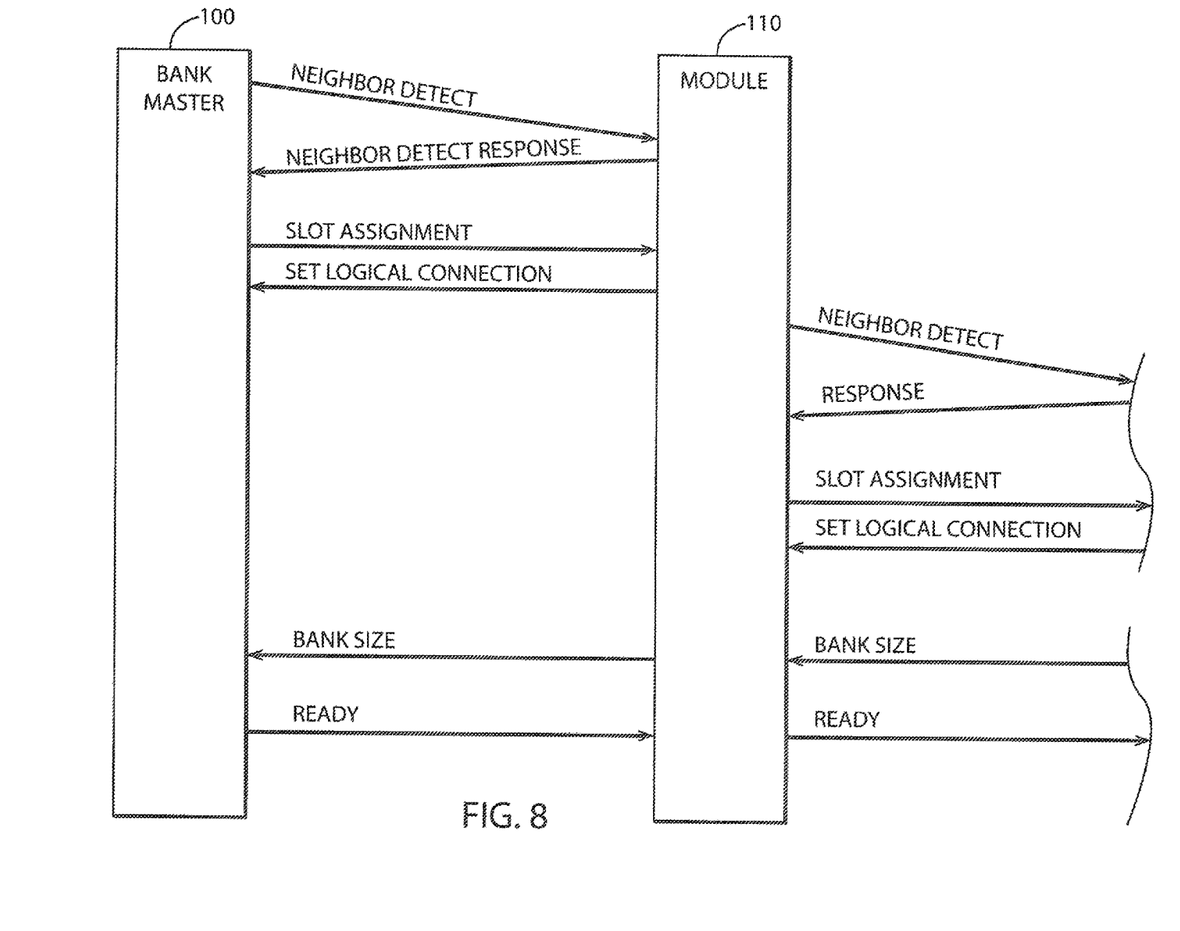
FIG. 8 is a graphical representation of message packets utilized for slot assignment according to one embodiment of the invention.
Figure 9:
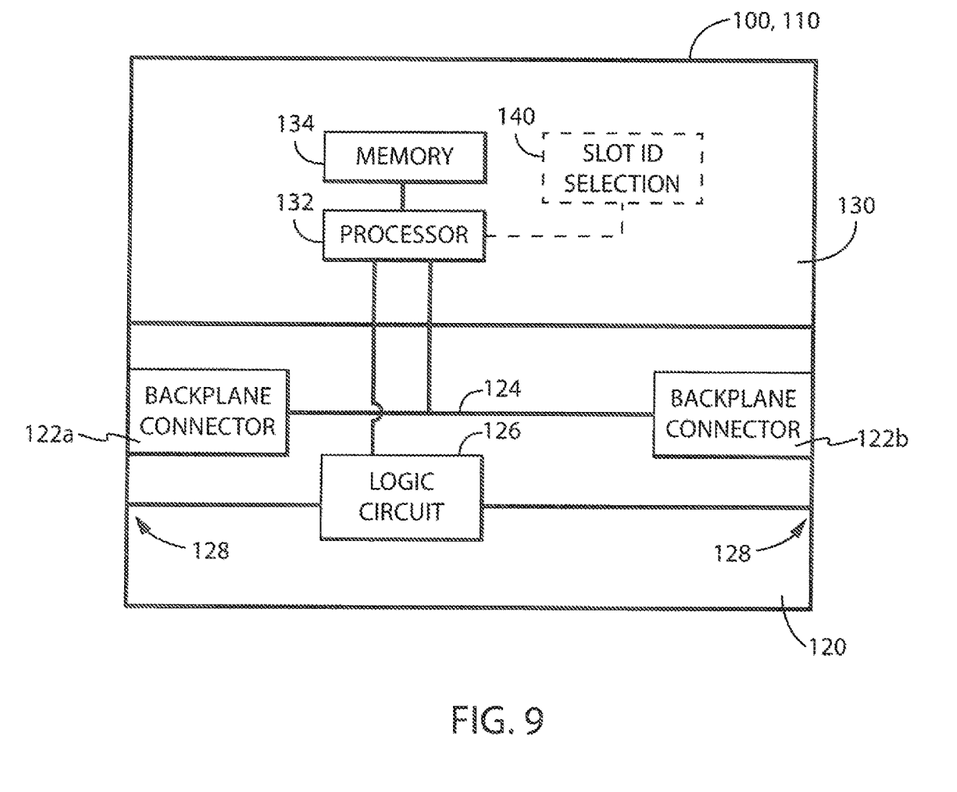
FIG. 9 is a partial block diagram representation of the modules used in FIG. 8.

With reference also to FIGS. 8 and 9, the slot addressing routine will be discussed with respect to an exemplary bank master 100 and an additional module 110 connected to the bank master 100. Although the bank master 100 and additional module 110 may perform different functions and include different components, each shares certain elements and both the bank master 100 and the additional module 110 will be discussed with respect to a single block diagram, as shown in FIG. 9, for convenience. The bank master 100 and the additional module 110 are illustrated having a base 120 and a chassis 130. The base 120 includes a pair of backplane connectors 122 where a first backplane connector 122a is located on one side of the base 120 and the second backplane connector 122b is located on the other side of the base 120. Each backplane connector 122 is configured to engage a complementary connector on an adjacent module. The backplane 124 is internally routed between the two connectors 122 and is in communication with a processor 132 in the chassis 130. The base 120 also includes connections 128 for the logical connection 11, as shown in FIG. 3, between modules. A logic circuit 126 may be included in the base 120 to process the logical connection as well as other signals passing through each base 120 and to provide the signal on the logical connection 11 to the processor 132.

The chassis 130 further includes memory 134 in communication with the processor 132 and configured to store instructions and configuration parameters for the bank master 100 or the additional module 110. A slot ID selector 140 may also be included in the chassis 130. In some embodiments, the bank master 100 and the additional modules 110 may not include the slot ID selector 140. The bank master 100 utilizes the slot ID selector 140 to determine the initial slot assignment it gives itself, as will be discussed in more detail below. If the bank master 100 does not include a slot ID selector, the bank master 100 may assign itself a predefined slot number, such as zero, one, or any other desired slot number. It is further contemplated that every module may include the slot ID selector 140 and each module may also include a bank master routine stored in memory 134. One of the configuration parameters may be set to define a module as the bank master and the selected module may then execute the bank master routine and access the slot ID selector 140 to determine its slot assignment. Any module not selected as the bank master will receive slot assignments as discussed in more detail below.

On power-up, the bank master 100 assigns itself a slot address. The bank master 100 reads a value from the slot ID selector 140 and assigns the value as its slot address. If no slot ID selector is present, the bank master 100 assigns itself a default value, such as zero or one as its slot address. Each module in a control system must be assigned a unique address for subsequent communication. Thus, during commissioning of the industrial control system, the slot ID selector 140 is set to a unique value for each module that will be a bank master 100. The slot ID selector 140 may be, for example, a series of DIP switches which may be set to a binary value for the slot address desired for each bank master 100. Each bank master 100 in the system can, therefore, assign itself a unique slot address on power-up.

After assigning a slot address to itself, each bank master 100 initiates a slot addressing routine for the rest of the modules in the bank 10. Turning next to FIG. 8, the bank master 100 first initiates a neighbor detect routine to determine whether any modules 110 are connected adjacent to the bank master 100. According to the embodiment illustrated in FIG. 3, the bank master 12 is located on the left-most side of the bank 10 and additional I/O modules 14 are connected to the right. The same configuration will be utilized with respect to the discussion of the slot addressing routine and the embodiment illustrated in FIG. 8. Because the bank master 100 is in the left-most position, the neighbor detect routine must only determine whether a module 110 is connected to the right side of the bank master 100. However, because no slot address has been assigned to the module, the bank master 100 cannot generate a traditional data packet for communication with the module 110, if present.

The bank master 100 prepares a neighbor detect packet for transmission along the backplane 19 to an adjacent module 110. Each module (the bank master 100 and any additional module 110) has a Media Access Control (MAC) address assigned to the module by the manufacturer. The bank master 100 includes its MAC address within the neighbor detect message packet. However, because the bank master 100 does not know whether another module 110 is connected and, if so, does not know a slot address or a MAC address of the adjacent module, the bank master 100 must send out a broadcast message that may be received by any adjacent module 110. A standard broadcast message would be transmitted along the backplane 19 to each module 110 in the bank. However, the neighbor detect message is a unique one-hop message. Because each bank 10 is configured in a daisy-chain configuration, the broadcast message must pass through the adjacent module 110 before being sent to any subsequent modules. Each module 110 is configured to identify a neighbor detect broadcast message and prevent further transmission of the message, making the neighbor detect message a one-hop message.

In some applications, a controller rack may include open slots or a DIN rail mounted bank of modules may include open bases having no chassis inserted. The open slot or base establishes a backplane communication path through the open slot or base to the next full slot or base with a chassis inserted. Because the open slot or base does not include a processor 132 to act on the message, the message is passed to the next full slot or next base with a chassis inserted, if one is to be found. The hardware for the open slot or base that establishes the backplane connection may also be configured to increment a counter for the message such that the slot distance between the bank master 100 and the next populated adjacent module 110 is known.

Upon receipt of the neighbor detect message, the adjacent module 110 prepares a neighbor detect response message. The adjacent module 110 extracts the MAC address from the neighbor detect message and stores the MAC address in its memory 134 to identify the neighbor to its left. The adjacent module 110 embeds its own MAC address in the neighbor detect response message and sends the neighbor detect response message packet to the bank master 100. If the slot distance is known, as indicated above, the adjacent module 110 may similarly embed the slot distance in the neighbor detect response message. Optionally, the slot distance may be detected only when the neighbor detect response message is sent, indicating that there is a populated neighbor either immediately adjacent to or at some distance from the bank master 100.

The bank master 100, upon receiving the neighbor detect response message, is able to assign a new slot address to the adjacent module 110. The bank master 100 extracts the MAC address from the neighbor detect response message and stores the MAC address in its memory 134 to identify the neighbor to the right. The bank master 100 calculates a new slot address for the adjacent module 110. According to one embodiment of the invention, the new slot address may be determined by adding one to its own slot address. Optionally, a slot distance, as detected during either the neighbor detect or neighbor detect response message transmissions may be added to the slot address. The bank master 100 then prepares a unicast slot assignment message for the neighboring module in which it can include its own MAC address as a source module and the neighboring module's MAC address as a destination module. The new slot address for the adjacent module 110 is included in the data portion of the slot assignment message. The bank master 100 then transmits the slot assignment message to the adjacent module 110 and, in tandem, sets an enable logic bit which is transmitted via the logical connection 11 between modules. Thus, the bank master 100 sends both a data packet and a hardware enable signal to the adjacent module 110 to indicate it is assigning the adjacent module 110 a new slot address.

The adjacent module 110, in turn, receives the slot assignment message and detects the enable logic bit on the logical connection 11 and assigns itself a new slot address. The adjacent module 110 first confirms that the slot assignment message was received from the module immediately to its left. The adjacent module 110 extracts the MAC address from the source module in the slot assignment message and compares that MAC address to the MAC address it previously stored during the neighbor detect process. The adjacent module 110 also verifies that the enable signal is present on the logical connection 11 as an indication it is to assign itself the slot address in the slot assignment message. When the adjacent module 110 has confirmed that the slot assignment message it received is from the module to its immediate left and that it is to assign itself the slot address in the slot assignment message, the adjacent module 110 extracts the slot address from the slot assignment message and stores the slot address in its memory 134.

Having assigned a new slot address to itself, the adjacent module 110, in turn, continues the slot addressing routine. The adjacent module 110 will initiate a new neighbor detect routine to determine whether any further modules 110 are connected adjacent to its right along the bank 10. If another module 110 is present, the first adjacent module 110 and the second adjacent module 110 execute the steps described above for the neighbor detect and slot assignment messages. The process is repeated until all adjacent modules 110 along the bank have been assigned a new slot address.

When the right-most module 110 initiates a neighbor detect sequence, it determines that there is no further module 110 to its right side. The right-hand connector on the module may have no connection or have an end cap, providing a terminating connection. In either embodiment, the neighbor detect message receives no response and the right-most module 110 determines that it is the last module in the bank 10. The right-most module 110 generates a bank size message for transmission back to the bank master 100. The bank size message includes an indication of the size of the bank 10. The indication of the size of the bank 10 may be, for example, the slot address of the last module 110 or, optionally, a bank size field may be included in each slot assignment message and incremented as successive modules 110 assign new slot addresses. The right-most module may or may not know the MAC address or the slot address of the bank master 100. According to one embodiment of the invention, the MAC address or the slot address of the bank master 100 is included in each slot assignment message such that each additional module 110 is able to store the address of the bank master 100 in its respective memory 134. If the right-most module knows the address of the bank master 100, the bank size message may be generated as a unicast message to the bank master 100. If the right-most module is not aware of the address for the bank master 100, the bank size message may be a broadcast or multicast message back along the backplane 19 of the bank 10. Each additional module 110 passes the bank size message along without acting on the message, while the bank master 100 receives the bank size message and prevents it from being transmitted beyond the bank 10 to other banks 10 and/or devices in the industrial network.

Upon receiving the bank size message, the bank master 100 now enables each of the modules in the bank 10 to begin performing the control functions of the module. The control functions may be, for example, setting output signals at output terminals or reading the input signals of input terminals. The control functions may further include accepting CIP communications from the industrial network for transmitting the state of the inputs and/or outputs between the modules and an industrial controller executing a control program. The CIP communications may be, for example, EtherNet/IP, DeviceNet, ControlNet, or other network adaptations of the CIP protocol. The bank master 100 extracts the indication of the bank size from the bank size message. If the indication of the bank size directly identifies the number of adjacent modules 110 present, the value may be stored directly into the memory 134 of the bank master. If the indication of the bank size is the slot address of the right-most module, the bank master 100 may subtract its slot address from the slot address of the right-most module to determine the number of adjacent modules 110 in the bank 10 and store this value in its memory 134. The bank master 100 then generates a ready message that is transmitted to each of the adjacent modules 110 in the bank. Upon receipt of the ready message, each module 110 may begin participating in CIP communications.

Turning next to FIG. 4, an industrial control system may include multiple banks 10a, 10b, 10c. At power-up, the bank master 100 assigned to each bank 10a, 10b, 10c initiates the slot addressing routine for its corresponding bank as discussed above. According to the illustrated embodiment, the adapter module 12 is the bank master 100 of the first bank 10a and each expansion module 25 is the bank master 100 of the second bank 10b and the third bank 10c. Upon receipt of a bank size message from the right-most module in the respective bank, each bank master 100 may perform an additional step to determine whether another bank master 100 is connected. A network cable 23 connects each of the bank masters 100, and the bank master 100 may send a broadcast or multicast message on the industrial network to identify other bank masters 100. Each additional bank master 100 may generate a response. If multiple bank masters 100 are present in the industrial control system, each bank master 100 may then transmit a subsequent message to the other bank masters identifying the range of slot addresses utilized within its respective bank. If one or more banks 10 are using identical or overlapping ranges, a setup fault is detected. The setup fault may be passed back to a central processor, such as a PLC, to alert the central processor and/or technical personnel of the assignment conflict. Further, should the setup fault be detected, each bank master 100 may delay or cancel transmission of the ready message to its bank, thereby preventing banks 10 with overlapping slot addresses from accepting CIP communications. Appropriate personnel may then reconfigure the slot ID selection 140 for one or more of the bank masters 100 to correct the overlapping slot address configuration.

Figure 5:
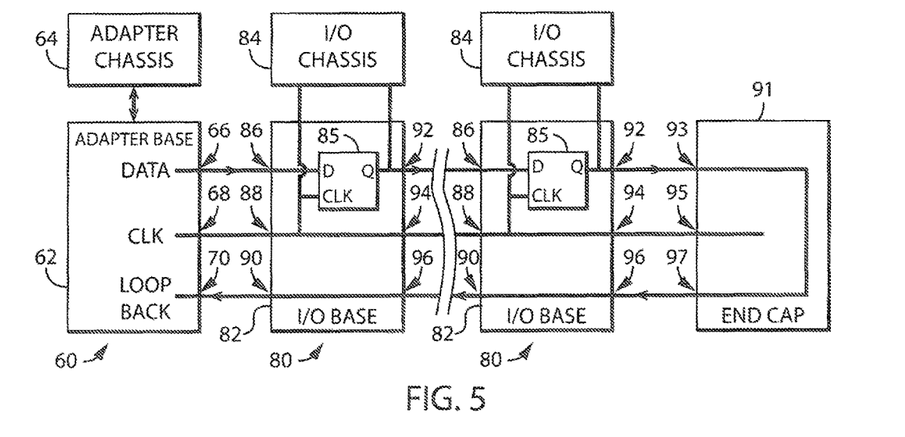
FIG. 5 is a simplified schematic representation of a single bank of modules according to another embodiment of the invention.

Turning next to FIG. 5, a second embodiment of the distributed slot addressing system is illustrated. According to the illustrated embodiment, an adapter module 60 is connected on the left-most side of the bank of modules and multiple I/O modules 80 are connected adjacent to each other and extending to the right along the bank of modules. The adapter module 60 includes an adapter base 62 and an adapter chassis 64. The adapter module 60 is configured to be the bank master and includes a slot assignment routine. It is contemplated that the slot assignment routine may be executed on a processor located in the adapter base 62, the adapter chassis 64, or on a combination thereof. The slot assignment routine is configured to provide a binary output signal to adjacent modules on a data output 66. The adapter module 60 also includes a clock circuit configured to generate a clock signal to be output to adjacent modules on a clock output 68. The data output 66 and the clock output 68 may be dedicated signal lines or, optionally, the data output 66 and the clock output 68 may be transmitted via the backplane. In either embodiment, the signals may be output to adjacent modules via the electrical connector 44 on the side of each base module 62, 82.

Each I/O module 80 includes an I/O base 82 and an I/O chassis 84, where the I/O base 82 is preferably identical for each of the I/O modules 80 in a bank 10 and different I/O chassis are plugged into each base 82 according to the desired number and type of inputs or outputs. Each I/O base 82 includes an electrical connector 44 on each side for connection to adjacent modules. The I/O base 82 includes a first input 86, or data input, and a second input 88, or clock input, configured to receive the data output 66 and the clock output 68, respectively, from the adjacent base to the left. Each I/O base 82 further includes a D-Q flip flop 85. As is understood in the art, a D-Q flip flop provides a one clock cycle delay for data input on the D terminal. Data provided to the D-terminal is initially latched within the D-Q flip flop 85 and upon the next clock pulse being received at the CLK input, the data on the D-terminal is provided at the Q terminal while new data present at the D-terminal is latched within the D-Q flip flop 85. Each I/O base 82 also includes a data output 92 and a clock output 94. The data output 92 is connected to the Q terminal of the D-Q flip flop 85 and the clock output 94 is connected directly to the clock input 88. Thus, each I/O base 82 passes the clock signal from the adapter base 62 to the next adjacent I/O base 82 without any logical delay, while the data signal transmitted by the adapter base 62 is passed to the next adjacent I/O base 82 with a one clock cycle delay at each I/O base 82.

An end cap 91 may be connected to the right side of the last I/O module 80 in each bank 10. The end cap 91 has a first input 93, or data input, and a second input 95, or clock input, configured to receive the data output 92 and the clock output 94 from the last I/O module. Within the end cap 91, a loop back connection is provided that connects the data input 93 to a data output 97 for transmission back to the adapter module 60. Each I/O module 80 includes a third input 96, or loopback input, and a third output 90, or loopback output, where the loopback input 96 is connected to the loopback output 90 to pass the data signal through each I/O module without any logical delay. The adapter module 60 also includes a loopback input 70 configured to receive the data signal from the left most I/O module 80. Thus, after passing through each of the I/O modules 80 the data signal output from the adapter module returns to the adapter module 60.

Although the illustrated embodiment has been discussed with respect to an adapter module 60 and multiple I/O modules 80 and their respective bases 62, 82, it is contemplated that other embodiments of the invention may utilize other modules such as network modules, expansion modules, counter modules, and the like, and corresponding bases may incorporate the combination of inputs, outputs, and logic circuitry discussed above without deviating from the scope of the invention.

On power up, the adapter module 60 initiates another embodiment of the distributed slot addressing routine to assign slot addresses to each module in the bank 10. Initially, the adapter module 60, operating as a bank master, assigns itself a slot address. In manner similar to that discussed above, the adapter module 60 (i.e., bank master 100) reads a value from a slot ID selector 140 and assigns the value as its slot address. If no slot ID selector is present, the adapter module 60 (i.e., bank master 100) assigns itself a default value, such as zero or one as its slot address.

Also at power-up, the data at each data input 86 for the I/O modules 80 is in a predefined state, such as zero. The adapter module 60 next generates a binary data pattern for transmission to each of the adjacent I/O modules 80, where the binary data pattern has n-bits. The number of bits may be configurable and stored in memory or is predefined, for example, as a function of the type or version of base being utilized. According to one embodiment, the binary data pattern includes eight bits. A first bit of the data pattern is set on the data output 66 and is, therefore, present at the data input 86 of the right-most I/O module 80. The adapter module 60 then begins driving the clock signal on the clock output 68, that is, the adapter module 60 toggles the state of the clock signal on the clock output 68.

On each clock cycle, the D-Q flip-flops 85 in the I/O modules transfers the data present on the data input 86 to the data output 92. On the first clock cycle, the first data bit of the data pattern will be transferred from the data input 86 of the left-most I/O module 80 to the data output 92 of the left-most I/O module 80. The first data bit of the data pattern is then available at the data input 86 of the next adjacent I/O module 80. The adapter module 60 will also place the second bit of the data pattern on the data output 66 for the adapter module 60 such that the second bit of the data pattern is now present at the data input 86 of the left-most I/O module 80. The sequence repeats on each clock cycle with the adapter module 60 placing a new bit on its data output 66 and each I/O module 80 transferring the bit present on its data input 86 to the corresponding data output 92.

When the last I/O module 80 transfers a bit from the data pattern to its data output 92, the bit becomes available to the data input 93 of the end cap 91. As previously discussed, the end cap 91 includes a loop back connection, such that the data present on the data input 93 of the end cap is placed at a loopback output 97. This data on the loop back output 97 is transmitted through each I/O module 80 back to the adapter module 60. The adapter module 60 continues toggling the clock signal until it has received all of the bits in the binary pattern back at its loopback input 70.

The binary pattern generated by the adapter module 60 is preferably a predefined pattern and known by each I/O module 80. As the pattern is passed through each I/O module 80, the I/O module maintains a count of the number of clock cycles received at its clock input 88. The count may be kept, for example, in a processor executing in the I/O chassis 84, which also receives the clock signal. When all of the bits of the binary pattern have reached each I/O module 80, the I/O module stores the number of clock cycles required to receive the bit pattern in memory on the I/O module 80.

After the adapter module 60 has received the complete bit pattern at its loopback input 70, the adapter module generates a slot calculate message for transmission to each I/O module 80. The slot calculate message is a broadcast or multicast message sent by the bank master to each of the other modules in the bank 10 on which it is located, and the adapter module 60 inserts the slot address it assigned to itself in the slot calculate message. Upon receipt of the slot calculate message, each I/O module 80 uses the number of clock cycles required to receive the binary bit pattern to determine its own slot address. Each I/O module 80 along the bank requires one additional clock cycle to receive the entire bit pattern. Thus, the first I/O module 80 adds one to the slot address in the slot calculate message, and the second I/O module 80 adds two to the slot address in the slot calculate message. Each successive I/O module 80 assigns itself a slot address incrementally higher than the slot address from the I/O module 80 to its left.

As previously discussed, in some applications a controller rack may include open slots or a DIN rail mounted bank of modules may include open bases having no chassis inserted. The open slot or base establishes a backplane communication path through the open slot or base to the next full slot or base with a chassis inserted; however, because the open slot or base does not include a processor 132 to act on the slot calculate message, no slot address is determined for the open slot or base. Each full slot or base may account for open slots by, for example, subtracting the length of the binary bit pattern from the total number of clock pulses required to receive the bit pattern to determine the slot distance for the corresponding module from the bank master. The corresponding slot address for adjacent, full modules may therefore, be increased by the slot distance rather than an incremental value.

After each I/O module 80 assigns itself a slot address, it sends a module ready back to the adapter module 60. The module ready message includes the slot address that each I/O module has determined and assigned to itself. The adapter module 60 may then compare the slot addresses to verify that each slot address in the bank is unique. As a result of this verification, the adapter module 60 is able to determine that each I/O module 80 properly received the binary data pattern and further, properly assigned itself a unique slot address. Upon completion of the verification, the adapter module 60 may send a ready message back to each of the I/O modules 80, allowing all modules in the bank 10 to begin accepting Common Industrial Protocol (CIP) communications from the industrial network.

Figure 6:
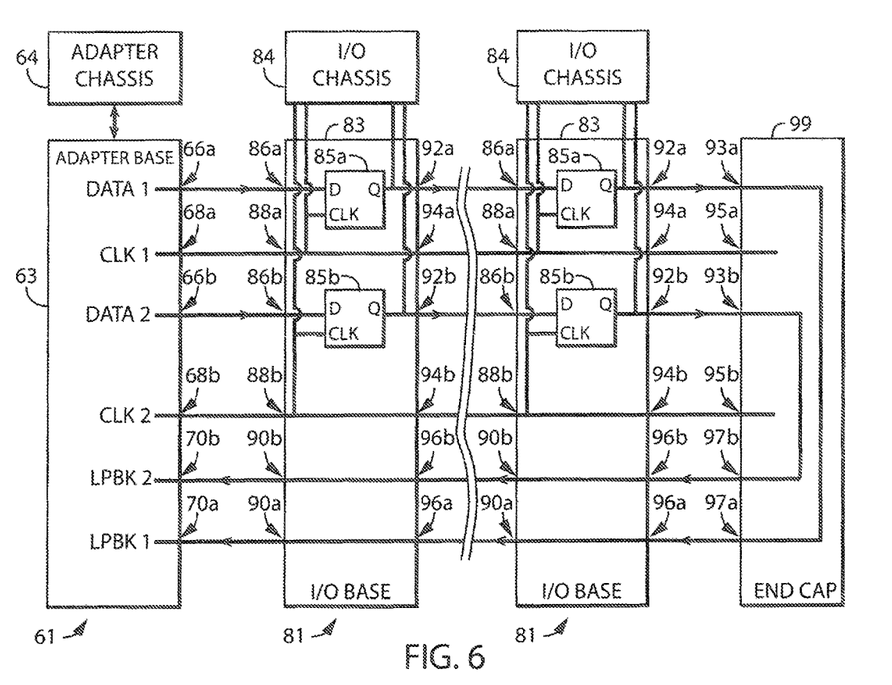
FIG. 6 is a simplified schematic representation of a single bank of modules according to another embodiment of the invention.

Turning next to FIG. 6, each module may be configured to provide redundancy in the slot assignment process. An adapter module 61 with a dual adapter base 63 may be provided with I/O modules 81 each having a dual I/O base 83. It is contemplated that the adapter chassis 64 and the I/O chassis 84 may be the same chassis as those utilized on the single bases 62, 82 but, optionally, unique chassis for each of the adapter module 61 and the I/O module 81 may also be provided.

Each dual base 63, 83 includes redundant slot assignment hardware. The adapter module 61 outputs the binary pattern on a first data output 66a and a second data output 66b in tandem. Similarly, the clock signal is output on a first clock output 68a and a second clock output 68b in tandem. The I/O module 81 receives the data signals on first and second data inputs 86a, 86b and the clock signals on first and second clock inputs 88a, 88b. The first data signal and first clock signal are provided to a first D-Q flip flop 85a, and the second data signal and the second clock signal are provided to a second D-Q flip-flop 85b. The output of each D-Q flip flop 85a, 85b is provided to corresponding data output 92a, 92b for the I/O module 81. The end cap 99 includes dual loopback paths which are similarly both passed back through each I/O module 81 to the adapter module 61.

With the redundant slot assignment hardware, each I/O module is able to monitor itself for a failure of the slot assignment hardware. A processor in the I/O chassis 84, I/O base 82, or combination thereof, may compare the data bit present on each data input 86a, 86b or the clock signal on each clock input 88a, 88b to verify that the I/O module 81 has received the same data at each paired input. The processor may similarly compare the data bit present on each data output 92a, 92b to verify that the first and second flip-flops 85a, 85b are operating properly. Further, the processor may maintain separate counts of each clock signal and independently calculate a slot address based on the data presented at each of the first and second sets of inputs. If, at any point during the slot assignment process, the data is not consistent, the I/O module 81 may generate a fault message and transmit the message back to the adapter module 61.

Optionally, the I/O module 81 may further be configured to perform a diagnostic routine upon detection of an error between the redundant hardware. For example, if the data output is inconsistent, the processor may provide data to the input of each D-Q flip flop 85a, 85b, toggle the clock bit and verify that the correct output is present. If one of the D-Q flip-flops has failed, the I/O module 81 may ignore the hardware path that is faulted and utilize the hardware path that is still functioning. In this manner, the I/O module 81 may still assign itself the correct slot address and allow the slot addressing routine to complete when one of the paths is faulted. The I/O module 81 may still generate and transmit a fault message to the adapter module 60 or back to a central PLC to alert an operator of the fault such that the I/O module 81 may be replaced or repaired at a convenient opportunity.

Figure 7:
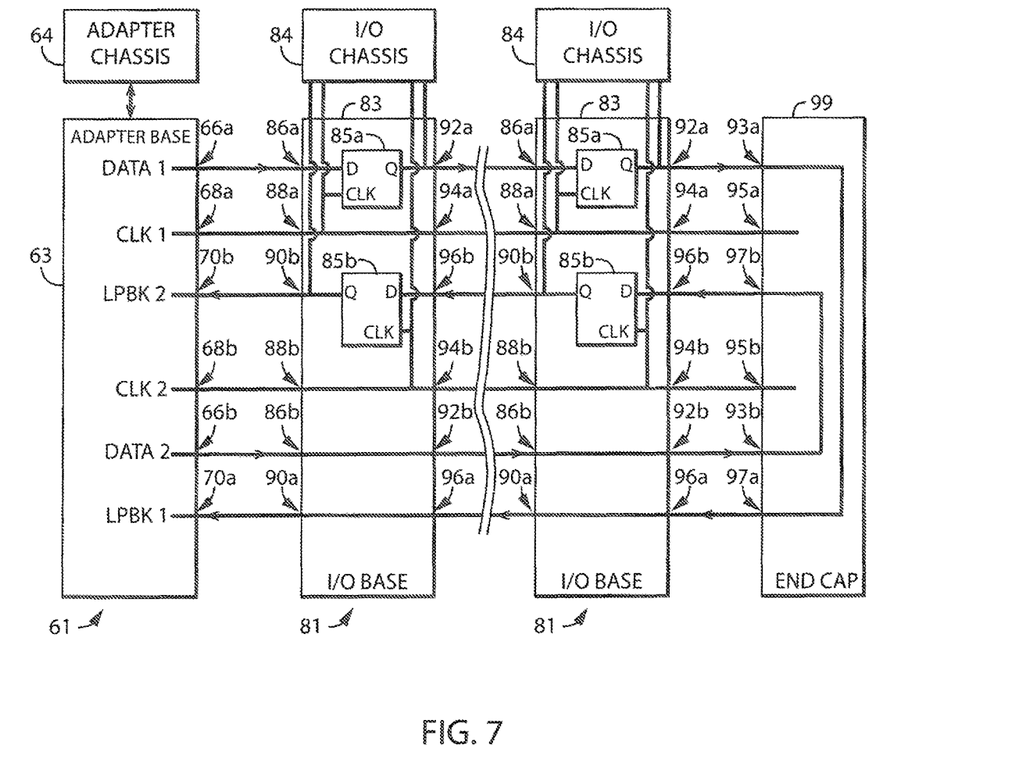
FIG. 7 is a simplified schematic representation of a single bank of modules according to still another embodiment of the invention.

According to still another embodiment, the D-Q flip-flops 85a, 85b in a dual base 63, 83 may be connected in a reverse direction with respect to each other as shown in FIG. 7. The adapter module 61 transmits the binary pattern on the first data output 66a and the second data output 66b in the same manner as previously discussed. However, as illustrated, the binary pattern from the second data output 66b is initially passed through each of the bases 83 and the end cap 99 and begins to loop back toward the adapter base 63. On each clock cycle, rather than bits being transferred through the bases 83 from left-to-right, the bits are transferred from right-to-left.

By sending the bit pattern in both directions through the bases 83, the illustrated embodiment of FIG. 7 allows for slot assignment to occur even in the event of a hardware failure between devices. If, for example, a single base fails such that neither data signal may be passed through the base, slot addressing may still occur with the modules located to the left of the failed device utilizing the bit pattern transferred from left-to-right and slot addressing of the modules located to the right of the failed device may occur utilizing the bit pattern transferred from right-to-left.

It is contemplated that the slot addressing routine discussed above with respect to FIGS. 5 and 6 may also be utilized on an industrial control system having multiple banks 10. Referring again to FIG. 4, an industrial control system may include multiple banks 10a, 10b, 10c. At power-up, the bank master 100 assigned to each bank 10a, 10b, 10c initiates the slot addressing routine for its corresponding bank as discussed above with each bank master 100 assigning itself a unique slot address. After each bank master 100 verifies that the additional modules in its bank 10 have correctly determined and assigned themselves unique slot addresses, each bank master 100 may perform the additional steps to determine whether another bank master 100 is connected and whether all modules in the control system have unique slot addresses as discussed above.

The above described slot addressing procedures provide a distributed method of assigning slot addresses throughout a control system. With minimal configuration to ensure only that each bank of modules utilizes a unique range of slot addresses, the modules may automatically detect other modules in the system and generate unique slot addresses for communication. The slot addressing may occur more quickly than a centralized module that must detect and assign addresses to all modules in a system. Such a system is more robust to single points of failure within the system. Each module retains the slot address assigned to it until power is cycled. Upon a subsequent power-up each bank module repeats the procedure. Such modularity further allows, for example, segments of a control system to be powered down for maintenance, expansion, or upgrading and when power is returned, that bank reassigns itself slot addresses without requiring the entire system to have new addresses assigned.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for assigning addresses to a plurality of modules in an industrial control system, the method comprising the steps of:
    assigning a first address to a first module in a bank of modules, wherein:
        each of the plurality of modules within the bank is connected in a daisy chain,
        the first module is selected from the plurality of modules, and
        each of the plurality of modules is connected in a sequence for communication between each of the modules and the first module is located at a first end of the sequence and assigns the first address to itself;
    generating a one hop message in the first module:
    transmitting the one hop message only to a second module connected adjacent to the first module along the daisy chain, wherein the second module is selected from the plurality of modules and the second module does not yet have an address assigned;
    transmitting a return message from the second module back to the first module responsive to the one hop message indicating the presence of the second module;
    generating a second address with the first module, the second address being different than the first address;
    transmitting the second address to the second module located in the bank;
    verifying the second address received by the second module, wherein the verification is performed by the second module;
    assigning the second address to the second module with the second module when the second module has verified the second address; and
    repeating the steps of generating a one hop message, transmitting the one hop message, transmitting a return message, generating the second address, transmitting the second address, verifying the second address, and assigning the second address with each of the remaining modules in the bank, wherein the second address is replaced by a unique address for each of the remaining modules until each of the plurality of modules in the bank receives one of the unique addresses.

2. The method of claim 1 wherein an enable line is connected between each of the adjacent modules along the daisy chain, the method further comprising the step of:
    sending an enable signal on the enable line when the unique address is transmitted between each of the adjacent modules, wherein the step of verifying the unique address at each module includes receiving the enable signal from the adjacent module.

3. The method of claim 1 further comprising the steps of:
    generating a bank size message with an end module, the end module located furthest along the bank from the first module and wherein the bank size message includes a number of modules located in the bank; and
    transmitting the bank size message from the end module to the first module after the end module has assigned itself one of the unique addresses.

4. The method of claim 3 further comprising the steps of:
    receiving the bank size message at the first module;
    verifying that the unique address of each of the plurality of modules is different via the first module; and
    transmitting a start automatic operation message from the first module to each of the other modules in the bank when the first module has verified that the unique address of each of the plurality of modules is different.

5. The method of claim 1 wherein the industrial control system includes at least two banks and each bank includes a plurality of modules, wherein one of the plurality of modules in each bank is selected as the first module for the bank.

6. The method of claim 5 further comprising the steps of:
    transmitting the unique addresses assigned within a first bank from the first module for the first bank to the first module of a second bank; and
    verifying that the unique addresses assigned within the first bank are different than the unique addresses assigned to the second bank.

7. A method for assigning addresses to a plurality of modules in an industrial control system, the method comprising the steps of:
    assigning a first address to a first module, selected from the plurality of modules, wherein the first module is located in a bank and assigns the first address to itself and wherein the plurality of modules are connected in a sequential manner along the bank and an end module located furthest along the bank from the first module is connected back to the first module;

generating a binary pattern in the first module for transmission to each of the plurality of modules;

transmitting the binary pattern one bit at a time to each of the plurality modules;

measuring a duration in each of the plurality of modules for which it takes the module to receive all bits of the binary pattern;

transmitting the first address from the first module to each of the other modules; and assigning a unique address to each of the other modules, wherein each of the other modules determines the unique address as a function of the duration measured in the corresponding module and of the first address.

8. The method of claim 7 further comprising the step of transmitting a clock signal from the first module while transmitting the binary pattern one bit at a time; and receiving the clock signal at each of the other modules, wherein the clock signal drives a flip-flop within each of the modules to shift the binary pattern through the module one bit at a time.

9. The method of claim 8 wherein:

the first module transmits the binary pattern from a first output and a second output in tandem, the first module transmits the clock signal from a third output and a fourth output in tandem, each of the other modules receives the binary pattern at a first input and a second input, each of the other modules receives the clock signal at a third input and a fourth input, each of the other modules include a first flip-flop and a second flip-flop, the first and third input of each of the other modules are connected to the first flip-flop, and the second and fourth input of each of the other modules are connected to the second flip-flop.

10. The method of claim 7 further comprising the steps of:

transmitting the binary pattern back to the first module after it has been transmitted to each of the plurality of modules;

generating a slot calculate message in the first module upon receipt of the binary pattern; and transmitting the slot calculate message to each of the other modules, wherein the step of assigning the unique address to each of the other modules is performed after each of the other modules receives the slot calculate message.

11. The method of claim 7 further comprising the steps of:

transmitting each unique address from the other modules to the first module; and verifying at the first module that each of the other modules generated a different unique address.

12. The method of claim 7 wherein the industrial control system includes at least two banks and each bank includes a plurality of modules, wherein one of the plurality of modules in each bank is selected as the first module for the bank.

13. A system for assigning addresses to a plurality of modules in an industrial control system, the system comprising:

a first module, selected from the plurality of modules, the first module includes:

at least one electrical connector;

a slot assigner executable on the first module to manage automatic assignment of a plurality of slot addresses, wherein a first slot address, selected from the plurality of slot addresses, is assigned to the first module; and a plurality of additional modules, each additional module selected from the plurality of modules, wherein the first module and each additional module define one bank of modules, and wherein each of the additional modules includes:

a first electrical connector operatively connected to one of the first module and another of the additional modules; and a second electrical connector operatively connected to one of another of the additional modules and an endcap, wherein:

the at least one electrical connector of the first module, the first electrical connector of each additional module, and the second electrical connector of each additional module is configured to transmit a plurality of data messages;

the slot assigner is further executable to:

generate a neighbor discovery message, transmit the neighbor discovery message via the at least one electrical connector to an adjacent module, wherein the adjacent module is selected from one of the plurality of additional modules and the first electrical connector of the adjacent module is operatively connected to the at least one electrical connector of the first module, receive a message from the adjacent module identifying the presence of the adjacent module, generate a second slot address with the first module, the second slot address being different than the first slot address, and transmit a slot assignment message including the second slot address to the adjacent module; and the first module communicates with each of the plurality of additional modules to verify that the first module and each of the plurality of additional modules is assigned one of the plurality of slot addresses.

14. The system of claim 13 wherein the slot assigner is further executable to:

generate an enable signal responsive to receiving the message from the adjacent module identifying the presence of the adjacent module; and output the enable signal to the adjacent module via a logical connection between the first module and the adjacent module.

15. A system for assigning addresses to a plurality of modules in an industrial control system, the system comprising:

a first module, selected from the plurality of modules, the first module includes:

at least one electrical connector, a slot assigner executable on the first module to manage automatic assignment of a plurality of slot addresses, wherein a first slot address, selected from the plurality of slot addresses is assigned to the first module; and a plurality of additional modules, each additional module selected from the plurality of modules, wherein the first module and each additional module define one bank of modules, and wherein each of the additional modules includes:

a first electrical connector operatively connected to one of the first module and another of the additional modules; and a second electrical connector operatively connected to one of another of the additional modules and an endcap, wherein:

the at least one electrical connector of the first module, the first electrical connector of each additional module, and the second electrical connector of each additional module is configured to transmit a binary pattern and a clock signal;

each of the plurality of additional modules further includes a flip-flop operatively connected in series between the first electrical connector and the second electrical connector;

the slot assigner is further executable to:
transmit the binary pattern and the clock signal from the at least one electrical connector to an adjacent module, wherein the adjacent module is selected form one of the plurality of additional modules and the first electrical connector of the adjacent module is operatively connected to the at least one electrical connector, and
receive the binary pattern from one of the plurality of additional modules located furthest from the first module along the bank of modules;

each of the plurality of additional modules is operable to store a duration of time between starting to receive the clock signal and receiving the complete binary pattern; and the first module communicates with each of the plurality of additional modules to transmit the first slot address to each of the additional modules and to verify that the first module and each of the plurality of additional modules is assigned one of the plurality of slot addresses.

16. The system of claim 15 wherein:
the slot assigner is further executable to:
generate a slot calculate message in which the first slot address is included, and
transmit the slot calculate message to each of the plurality of additional modules;

each of the plurality of additional modules determines a unique slot address as a function of the first slot address and the duration of time between starting to receive the clock signal and receiving the complete binary pattern; and the unique slot address is one of the plurality of slot addresses.

17. The system of claim 13 wherein the first module is a first bank master module, the system further comprising:
a second bank of modules, the second bank of modules including:
a second bank master module; and
a plurality of additional modules.

18. The system of claim 17 wherein the first and the second bank master module each includes a manual slot identification selector.

* * * * *